(12) United States Patent
Furuhashi et al.

(10) Patent No.: US 10,191,606 B2
(45) Date of Patent: Jan. 29, 2019

(54) LIQUID CRYSTAL DISPLAY DEVICE WITH TOUCH SCREEN

(71) Applicants: JAPAN DISPLAY INC., Tokyo (JP); PANASONIC LIQUID CRYSTAL DISPLAY CO., LTD., Hyogo-Ken (JP)

(72) Inventors: Tsutomu Furuhashi, Yokohama (JP); Norio Mamba, Kawasaki (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 15/959,393

(22) Filed: Apr. 23, 2018

(65) Prior Publication Data

US 2018/0239474 A1    Aug. 23, 2018

Related U.S. Application Data

(63) Continuation of application No. 14/710,266, filed on May 12, 2015, now Pat. No. 9,983,758, which is a (Continued)

(30) Foreign Application Priority Data

Nov. 29, 2006  (JP) ................ 2006-321551

(51) Int. Cl.
| | |
|---|---|
| G06F 3/047 | (2006.01) |
| G06F 3/041 | (2006.01) |
| G09G 5/18 | (2006.01) |
| G09G 3/36 | (2006.01) |
| G06F 3/044 | (2006.01) |
| G09G 5/00 | (2006.01) |

(52) U.S. Cl.
CPC .............. *G06F 3/047* (2013.01); *G06F 3/044* (2013.01); *G06F 3/0412* (2013.01); *G09G 3/3611* (2013.01); *G09G 5/006* (2013.01); *G09G 5/18* (2013.01); *G06F 2203/04111* (2013.01); *G09G 2300/0404* (2013.01)

(58) Field of Classification Search
CPC ................... G06F 3/047; G06F 3/0412; G06F 2203/04111; G09G 3/3611; G09G 5/006; G09G 5/18; G09G 2300/0404
See application file for complete search history.

(56) References Cited

U.S. PATENT DOCUMENTS

| | | |
|---|---|---|
| 4,394,643 A | 7/1983 | Williams |
| 6,211,934 B1 | 4/2001 | Habing et al. |
| (Continued) | | |

FOREIGN PATENT DOCUMENTS

| | | |
|---|---|---|
| CN | 1416002 A | 5/2003 |
| JP | 2006-023904 A | 1/2006 |
| JP | 2006-146895 A | 6/2006 |

*Primary Examiner* — Benyam Ketema
(74) *Attorney, Agent, or Firm* — Typha IP LLC

(57) ABSTRACT

A liquid crystal display device includes a first substrate, a second substrate, and a liquid crystal material sandwiched between the first and second substrate. The second substrate has a touch screen electrode directly on a front-side surface of the second substrate. The first substrate has a wiring line for supplying a position detection voltage. A conductive tape electrically connects between the touch screen electrode and a driver circuit. A polarization plate is disposed above the touch screen electrode.

10 Claims, 10 Drawing Sheets

Related U.S. Application Data continuation of application No. 13/405,892, filed on Feb. 27, 2012, now Pat. No. 9,081,449, which is a continuation of application No. 11/946,141, filed on Nov. 28, 2007, now Pat. No. 8,139,037.

(56) References Cited

U.S. PATENT DOCUMENTS

| | | | |
|---|---|---|---|
| 6,781,579 | B2 | 8/2004 | Huang et al. |
| 7,348,964 | B1 | 3/2008 | Gettemy et al. |
| 7,663,607 | B2* | 2/2010 | Hotelling .............. G06F 3/0416 345/173 |
| 8,031,180 | B2* | 10/2011 | Miyamoto ............ G06F 3/0412 345/156 |
| 8,243,027 | B2 | 8/2012 | Hotelling et al. |
| 2003/0222857 | A1 | 12/2003 | Abileah |
| 2004/0070572 | A1* | 4/2004 | Nakajima .............. G06F 3/041 345/173 |
| 2004/0217945 | A1* | 11/2004 | Miyamoto ............ G06F 3/0412 345/173 |
| 2005/0035953 | A1 | 2/2005 | Woolley et al. |
| 2005/0037184 | A1* | 2/2005 | Halsey, IV ........ B32B 17/10018 428/210 |
| 2005/0041018 | A1 | 2/2005 | Philipp |
| 2005/0046622 | A1 | 3/2005 | Nakanishi et al. |
| 2005/0083307 | A1* | 4/2005 | Aufderheide ........... G06F 3/044 345/173 |
| 2005/0099402 | A1* | 5/2005 | Nakanishi ............. G06F 3/0412 345/173 |
| 2006/0027909 | A1 | 2/2006 | Kobayashi |
| 2006/0097991 | A1 | 5/2006 | Hotelling et al. |
| 2006/0132000 | A1 | 6/2006 | Katsuki et al. |
| 2006/0232559 | A1* | 10/2006 | Chien ..................... G06F 3/044 345/168 |
| 2007/0159561 | A1 | 7/2007 | Chien |
| 2007/0257894 | A1* | 11/2007 | Philipp .................. G06F 3/044 345/173 |
| 2007/0262966 | A1 | 11/2007 | Nishimura et al. |
| 2008/0143683 | A1* | 6/2008 | Hotelling .............. G06F 3/0416 345/173 |
| 2009/0146945 | A1 | 6/2009 | Cho |
| 2009/0315857 | A1 | 12/2009 | Nishitani et al. |
| 2010/0066650 | A1 | 3/2010 | Lee et al. |
| 2010/0134439 | A1* | 6/2010 | Ito ........................ G06F 3/0416 345/174 |
| 2011/0001706 | A1* | 1/2011 | Sanford ................ G06F 3/0412 345/173 |
| 2012/0206396 | A1* | 8/2012 | Kitabayashi .......... G06F 3/0412 345/173 |
| 2014/0134411 | A1 | 5/2014 | Sung |
| 2014/0327838 | A1 | 11/2014 | Li et al. |
| 2014/0362029 | A1* | 12/2014 | Mo ......................... G06F 3/044 345/174 |

* cited by examiner

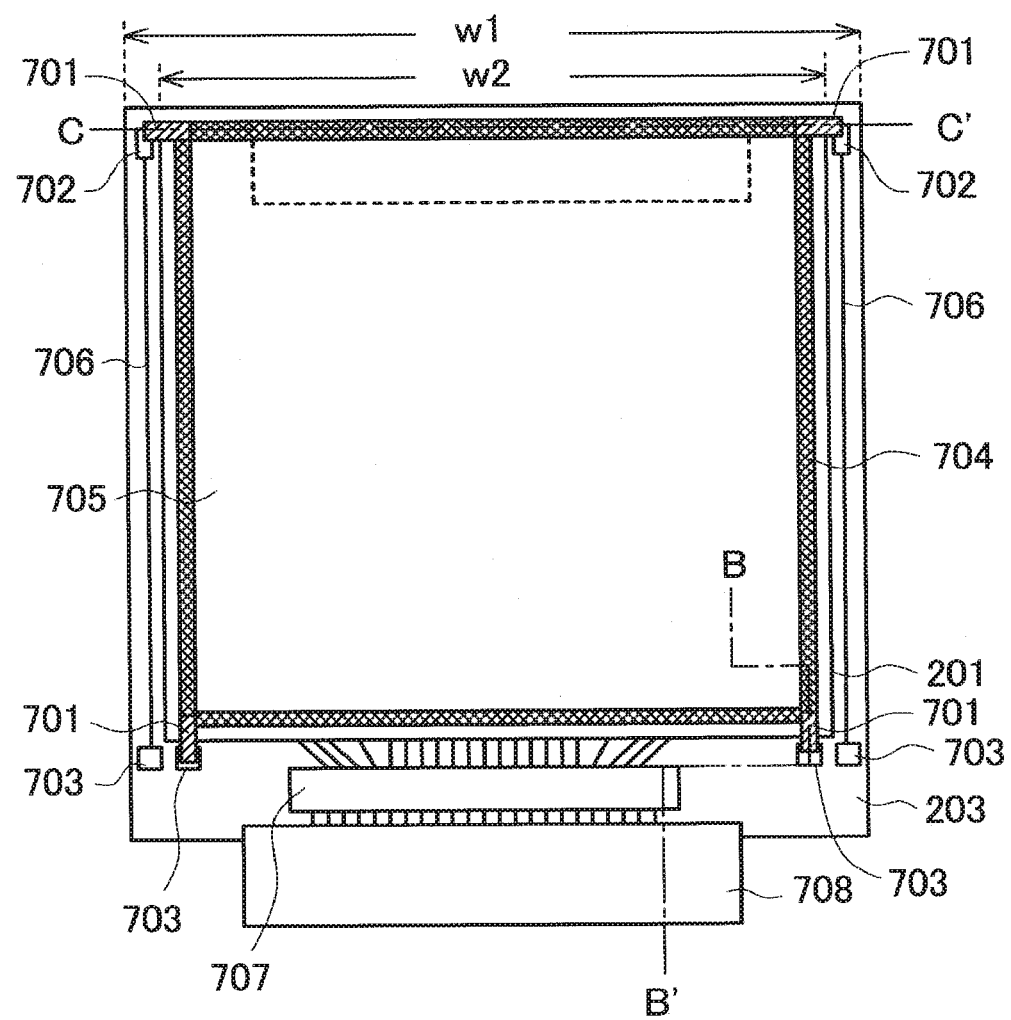

LIQUID CRYSTAL DISPLAY DEVICE WITH TOUCH SCREEN

CROSS-REFERENCE TO RELATED APPLICATIONS

This application is continuation of U.S. patent application Ser. No. 14/710,266, filed on May 12, 2015, which is a continuation of U.S. patent application Ser. No. 13/405,892 (now U.S. Pat. No. 9,081,449), filed on Feb. 27, 2012, which is a continuation of U.S. patent application Ser. No. 11/946,141 (now U.S. Pat. No. 8,139,037), filed on Nov. 28, 2007, and claims priority from Japanese application No. 2006-321551 filed on Nov. 29, 2006, the contents of which are incorporated herein by reference.

BACKGROUND OF THE INVENTION

Field of the Invention

The present invention relates to a liquid crystal display device with a touch screen, and particularly to a liquid crystal display device with a touch screen having capacitive high-transmittance touch screen function.

Background Art

An IPS liquid crystal display device is known as one type of liquid crystal display devices. In an IPS liquid crystal display device, pixel electrodes and counter electrodes are formed on the same substrate and an electric field is applied between each pair of the pixel electrodes and the counter electrodes to rotate liquid crystal molecules in the substrate plane for contrast control. The IPS liquid crystal display device is therefore characterized in that the grayscale of a displayed image is not reversed when the screen is viewed in an oblique direction.

The IPS liquid crystal display panel has no counter electrode on the substrate on which color filters are provided, unlike a TN liquid crystal display panel and a VA liquid crystal display panel. Therefore, to reduce display noise and from other reasons, a transparent conductive layer is formed on the front side of the color filter substrate (the side opposite to where the color filters are provided) (see Japanese Patent No. 2,758,864).

In recent years, widespread use of mobile devices increases the importance of the touch screen technology that supports a "user friendly" graphical user interface.

A capacitive touch screen is known as one of the touch screen technologies. A typical capacitive touch screen includes a touch screen substrate in which a conductive coating (transparent conductive layer) is applied on the front side (and the backside) of a glass substrate, and position detection is carried out when a finger of an operator touches the touch screen substrate.

A liquid crystal display device having the above touch screen substrate attached to the front side of the liquid crystal display panel is also known as a liquid crystal display device with a touch screen. In such a liquid crystal display device with a touch screen, when a finger of the operator touches the menu screen displayed on the liquid crystal display panel, the display device is operated according to the selected menu (see "Development of capacitive high-transmittance touch screen", Saburo Miyamoto and four others, SHARP Technical Report, 92, August, 2005, pp. 59-63) (hereinafter referred to as Document 1).

Related art documents relevant to the invention include Japanese Patent No. 2,758,864 and "Development of capacitive high-transmittance touch screen", Saburo Miyamoto and four others, SHARP Technical Report, 92, August, 2005, pp. 59-63.

SUMMARY OF THE INVENTION

However, the liquid crystal display panel with a touch screen described in Document 1 has a problem of reduction in light transmittance approximately by 15% due to the touch screen substrate attached to the front side of the liquid crystal display panel.

Furthermore, the touch screen substrate and other parts are necessary as extra parts, disadvantageously contributing to increase in cost.

The invention has been made to solve the above problems of the related art. An object of the invention is to provide a liquid crystal display device with a touch screen that does not reduce light transmittance but achieves cost reduction.

The foregoing and other objects as well as novel features of the invention will be apparent from the description in the specification and the accompanying drawings.

The summary of representative inventive aspects disclosed herein is briefly described as follow:

(1) A liquid crystal display device with a touch screen includes a first substrate, a second substrate disposed in front of the first substrate (on the viewer side), and liquid crystal material sandwiched between the first and second substrates. The second substrate has a transparent conductive layer on the front-side surface (the side opposite to where the liquid crystal material is disposed), and the transparent conductive layer is used as a transparent electrode of the capacitive touch screen.

(2) In (1), the liquid crystal display device with a touch screen further includes a conductive member disposed on the transparent conductive layer.

(3) In (2), the conductive member is a conductive polarizer plate.

(4) In (1) to (3), the liquid crystal display device is an IPS liquid crystal display device.

(5) In (1) to (4), the transparent conductive layer is shaped to have four corners, and alternating voltage for position detection is supplied to each of the four corners.

(6) In (5), alternating voltages for position detection having the same phase and the same potential are supplied to the four corners.

(7) In (6), the liquid crystal display device with a touch screen has a planar transparent conductive layer, and carries out the position detection based on inner node voltages outputted from the four corners of the planar transparent conductive layer.

(8) In (7), the liquid crystal display device with a touch screen detects the position where a contact member comes into contact with the conductive member.

(9) In (8), the liquid crystal display device with a touch screen further includes a drive circuit that drives the liquid crystal display device with a touch screen. The drive circuit includes a position detection alternating voltage generation circuit that inputs the alternating voltage for position detection and a coordinate detection circuit that detects the position where the contact member comes into contact with the conductive member.

(10) In (9), the coordinate detection circuit includes four waveform detection circuits provided in correspondence to the four corners, and a coordinates position calculation circuit that receives outputs of the four waveform detection circuits and calculates the coordinates position. Each of the waveform detection circuits receives the alternating voltage for position detection inputted to the corresponding corner of the planar transparent conductive layer and the inner node voltage outputted from the corresponding corner of the planar transparent conductive layer.

(11) In (10), each of the waveform detection circuits includes a first comparison circuit that compares the alternating voltage for position detection inputted to the corresponding corner of the planar transparent conductive layer with the inner node voltage outputted from the corresponding corner of the planar transparent conductive layer, a second comparison circuit that compares the output of the first comparison circuit with a reference voltage, a counter that converts the period when the output of the second comparison circuit is a first voltage into a count, and a filter circuit that averages output of the counter.

(12) In (11), the reference voltage is obtained by dividing the alternating voltage for position detection generated in the position detection alternating voltage generation circuit.

(13) A liquid crystal display device with a touch screen includes a first substrate, a second substrate disposed in front of the first substrate (on the viewer side), and liquid crystal material sandwiched between the first and second substrates. The second substrate has a planar transparent conductive layer on the front-side surface (the side opposite to where the liquid crystal material is disposed), and a polarizer plate disposed on the transparent conductive layer. The transparent conductive layer is used as a transparent electrode of the capacitive touch screen.

(14) In (13), the transparent conductive layer is shaped to have four corners, and alternating voltage for position detection is supplied to each of the four corners,

(15) In (13) or (14), the polarizer plate is a conductive polarizer plate.

Advantageous effects obtained by the representative inventive aspects disclosed herein are briefly described as follow:

According to the liquid crystal display device with a touch screen of the invention, since the transparent electrode on the front side of the color filter substrate (the side opposite to where the color filters are formed) also serves as the transparent electrode of the capacitive touch screen, no new touch screen substrate is required, thus preventing reduction in transmittance and increase in cost.

BRIEF DESCRIPTION OF THE DRAWINGS

FIG. 7 shows an example of the specific configuration of the liquid crystal display panel according to the embodiment of the invention;

DESCRIPTION OF THE PREFERRED EMBODIMENT

Figure 1:
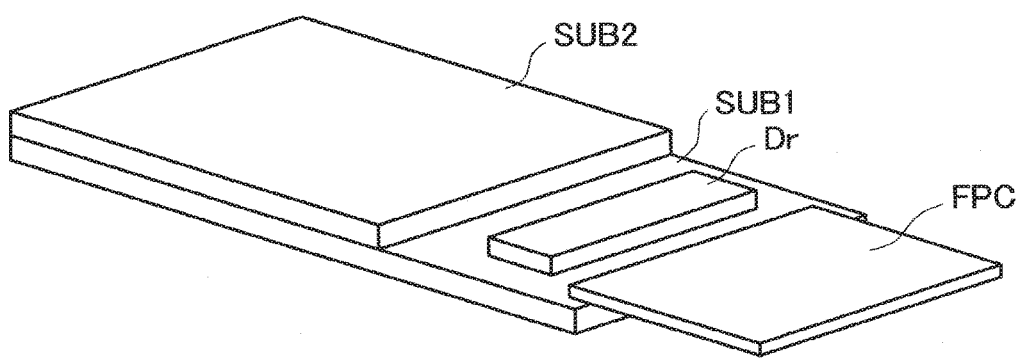
FIG. 1 is a block diagram showing a schematic configuration of the liquid crystal display module with a touch screen according to an embodiment of the invention.

An embodiment of the invention will be described below in detail with reference to the drawings.

Throughout the drawings used for describing the embodiment, portions having the same function have the same reference character and redundant description thereof will be omitted.

FIG. 1 is a block diagram showing a schematic configuration of the liquid crystal display module with a touch screen according to this embodiment of the invention. The liquid crystal display module with a touch screen according to this embodiment is a small-sized TFT liquid crystal display module used as the display section of a mobile phone or the like. The touch screen is also referred to as a touch screen.

As shown in FIG. 1, the liquid crystal display panel of this embodiment includes a first substrate (also referred to as a TFT substrate or an active matrix substrate) (SUB1) on which pixel electrodes, thin film transistors and the like are provided, and a second substrate (also referred to as a counter substrate) (SUB2) on which color filters are provided. The first and second substrates are overlaid with a predetermined gap therebetween and bonded to each other with a seal material provided around a frame-like area close to the peripheries of the two substrates. Liquid crystal material is then injected inside the seal material between the two substrates through a liquid crystal injection port provided at part of the seal material, and the injected liquid crystal material is encapsulated. Polarizer plates are attached to outer surfaces of the bonded substrates.

The liquid crystal display module of this embodiment thus has a configuration in which the liquid crystal material is sandwiched between the pair of substrates.

The first substrate (SUB1) is larger than the second substrate (SUB2). A semiconductor chip (Dr) that forms a driver for driving the thin film transistors is mounted on the area of the first substrate (SUB1) that does not face the second substrate (SUB2). A flexible printed circuit board (FPC) is mounted at one of the peripheries of that area.

Figure 2:
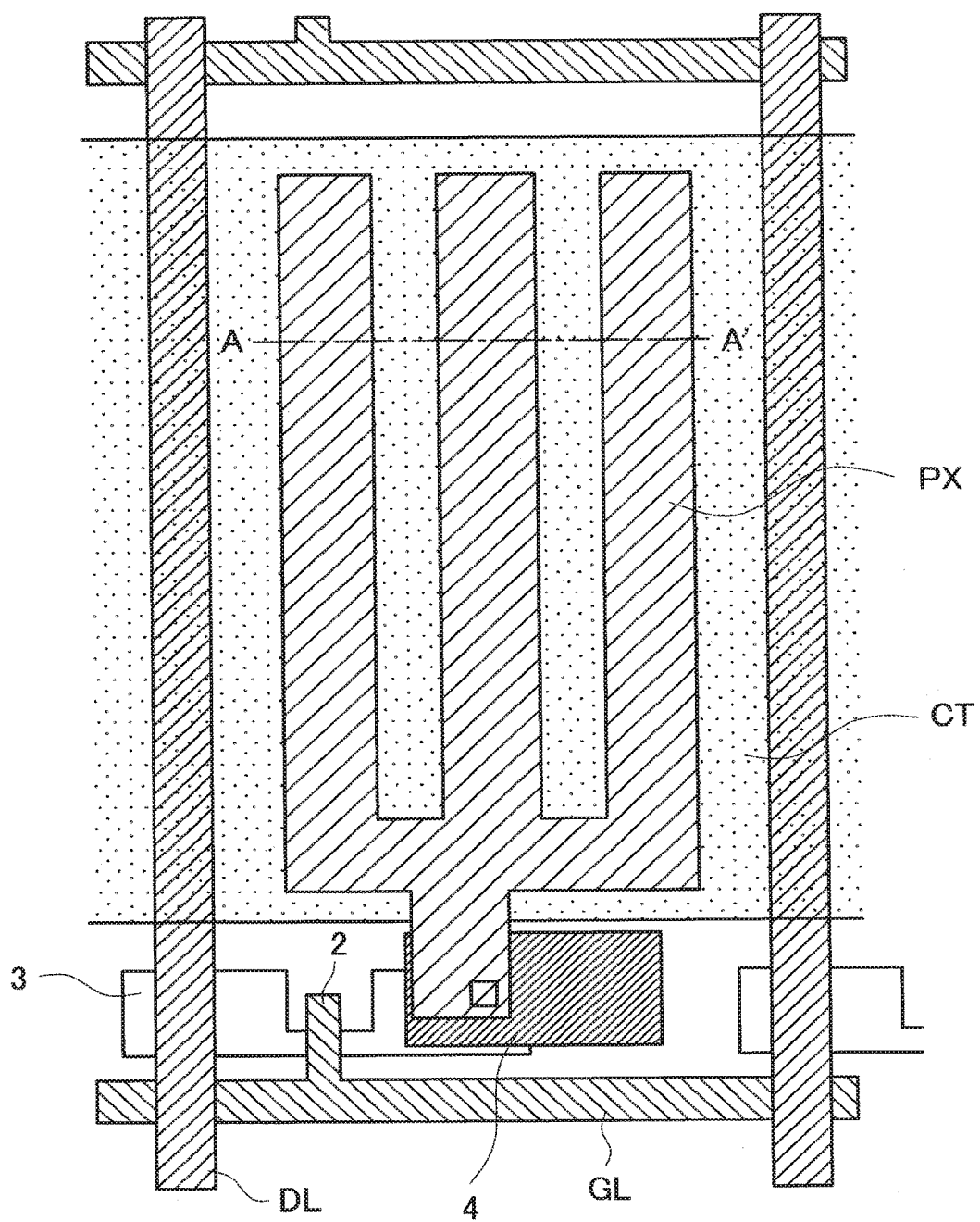
FIG. 2 is a plan view showing the configuration of one subpixel in the liquid crystal display panel according to the embodiment of the invention.

FIG. 2 is a plan view showing the configuration of one subpixel in the liquid crystal display panel according to the embodiment of the invention.

Figure 3:
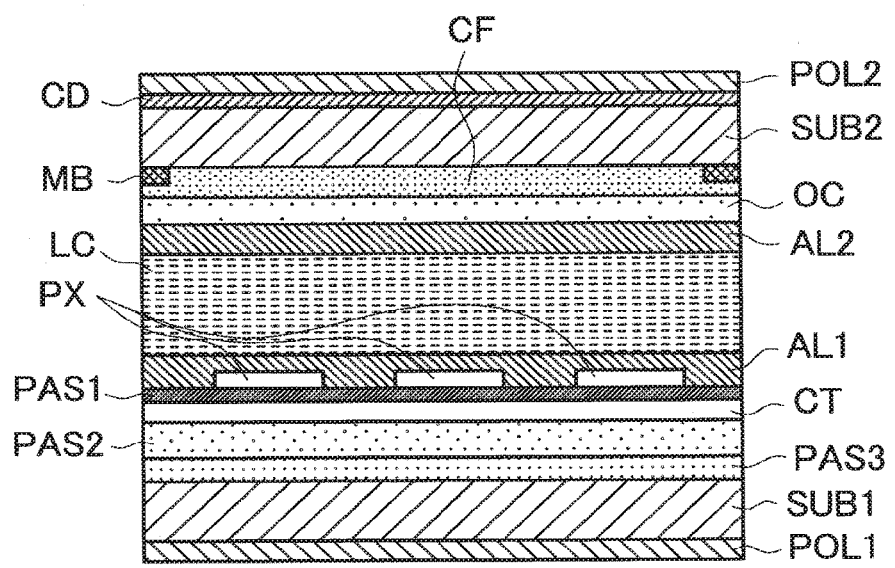
FIG. 3 is a cross sectional view showing the cross-sectional structure taken along the cutting line A-A' shown in FIG. 2.

FIG. 3 is a cross-sectional view showing the cross-sectional structure taken along the cutting line A-A' shown in FIG. 3. The structure of the liquid crystal display panel of this embodiment will be described below with reference to FIG. 2.

The liquid crystal display panel of this embodiment is an IPS liquid crystal display panel using planar counter electrodes, and the principal surface side of the second substrate (SUB2) is the viewing side. The top side in FIG. 3 is the principal surface.

The second substrate (SUB2) is formed of a transparent substrate, such as a glass substrate and a plastic substrate. On the liquid crystal layer (LC) side of the second substrate (SUB2), there are formed a light blocking layer (BM)/color filter layer (CF), an overcoat layer (OC), and an orientation layer (AL2) in this order from the second substrate (SUB2) toward the liquid crystal layer (LC). Furthermore, a transparent conductive layer (CD) and a polarizer plate (POL2) are formed on the outer surface of the second substrate (SUB2).

The first substrate (SUB1) is formed of a transparent substrate, such as a glass substrate and a plastic substrate. On the liquid crystal layer (LC) side of the first substrate (SUB1), there are formed a scan line (also referred to as a gate line) (GL, not shown), an interlayer insulating layer (PAS3), a transparent electrode that functions as a counter electrode (ITO2), an image line (also referred to as a drain line or a source line) (DL, not shown), an interlayer insulating layer (PAS2), a planar counter electrode (CT), an interlayer insulating layer (PAS1), a pixel electrode (PX) with a comb electrode, and an orientation layer (AL1) in this order from the first substrate (SUB1) toward the liquid crystal layer (LC). Furthermore, a polarizer plate (POL1) is formed on the outer surface of the first substrate (SUB1).

In FIG. 2, reference numeral 2 denotes a gate electrode. Reference numeral 3 denotes a semiconductor layer. Reference numeral 4 denotes a source electrode (referred to as a drain electrode when the image line (DL) is referred to as a source line).

An IPS liquid crystal display panel has no counter electrode (CT) on the substrate on which color filters are provided, unlike a TN liquid crystal display panel and a VA liquid crystal display panel. Therefore, to reduce display noise and from other reasons, the transparent conductive layer (CD) is formed on the substrate where the color filters are provided. The transparent conductive layer (CD) on the front side of the color filter substrate (the side opposite to where the color filters are provided) is hereinafter referred to as a backside transparent electrode (CD).

In the invention, the backside transparent conductive layer (CD) also serves as the transparent electrode of the capacitive touch screen to achieve the touch screen function.

Figure 4:
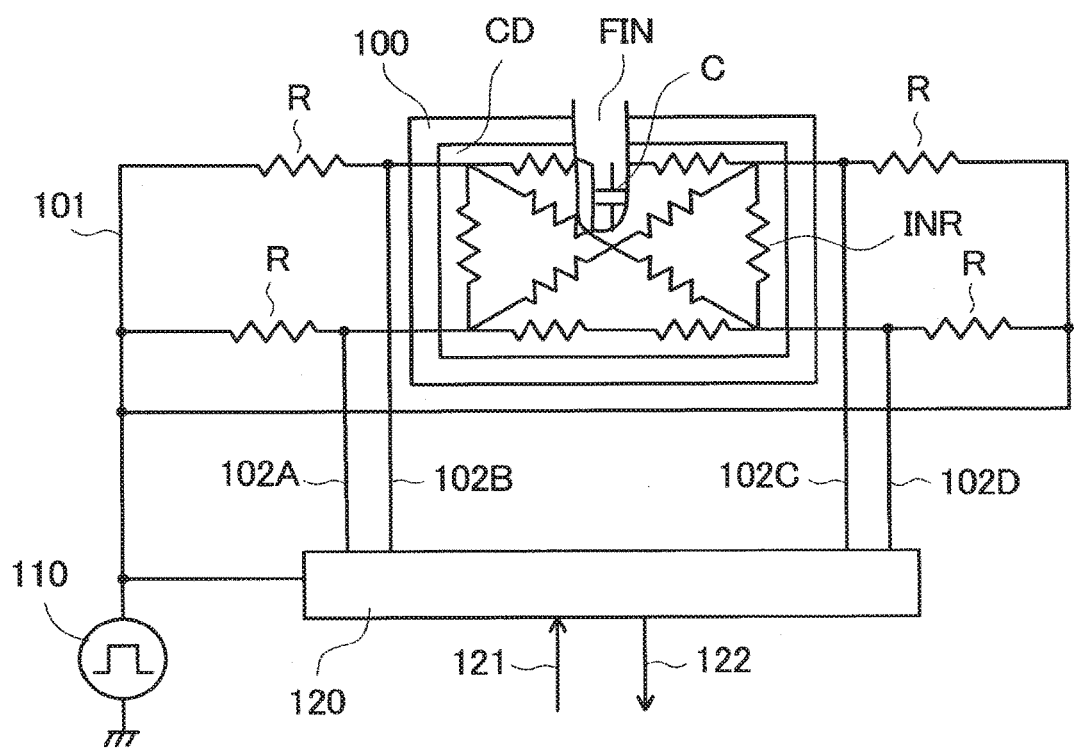
FIG. 4 is a block diagram for explaining the touch screen function of the liquid crystal display panel according to the embodiment of the invention.

FIG. 4 is a block diagram for explaining the touch screen function of the liquid crystal display panel according to this embodiment of the invention.

As shown in FIG. 4, the backside transparent conductive layer (CD) formed on the outer surface of the second substrate (SUB2) is expressed by an equivalent circuit having inner resistance (INR) formed on the entire surface.

Inner node voltage lines (102A, 102B, 102C, and 102D) are extended from the four corners (upper right, lower right, upper left, and lower left) of the backside transparent conductive layer (CD) and connected to a coordinate detection circuit 120.

The inner node voltage lines (102A, 102B, 102C, and 102D) are also connected to a transparent conductive layer input voltage generation circuit 110 via resistors (R) and a transparent conductive layer input voltage line 101.

When the transparent conductive layer input voltage generation circuit 110 generates and outputs alternating voltage, the alternating voltages at both ends of each of the resistors (R) have voltage waveforms having different time constants due to the influence of the resistor (R), the inner resistance (INR) of the transparent conductive layer (CD), the parasitic capacitance (not shown) added to the transparent conductive layer (CD), and capacitive (C) component of a contact member (a finger of the viewer in this embodiment) (FIN).

Furthermore, according to the position where the finger (FIN) makes contact, the voltage waveforms that appear on the inner node voltage lines (102A, 102B, 102C, and 102D) become voltage waveforms having different time constants.

The coordinate detection circuit 120 detects the state of differential voltage between the voltage waveforms that appear on the transparent conductive layer input voltage line 101 and each of the inner node voltage lines (102A, 102B, 102C, and 102D) to detect the contact/non-contact state and the contact position (coordinates) of the finger (FIN).

The transparent conductive layer input voltage generation circuit 110 and the coordinate detection circuit 120 may be implemented in the semiconductor chip (Dr) shown in FIG. 1, or may be externally provided (on the mobile phone body side in this embodiment).

Figure 5:
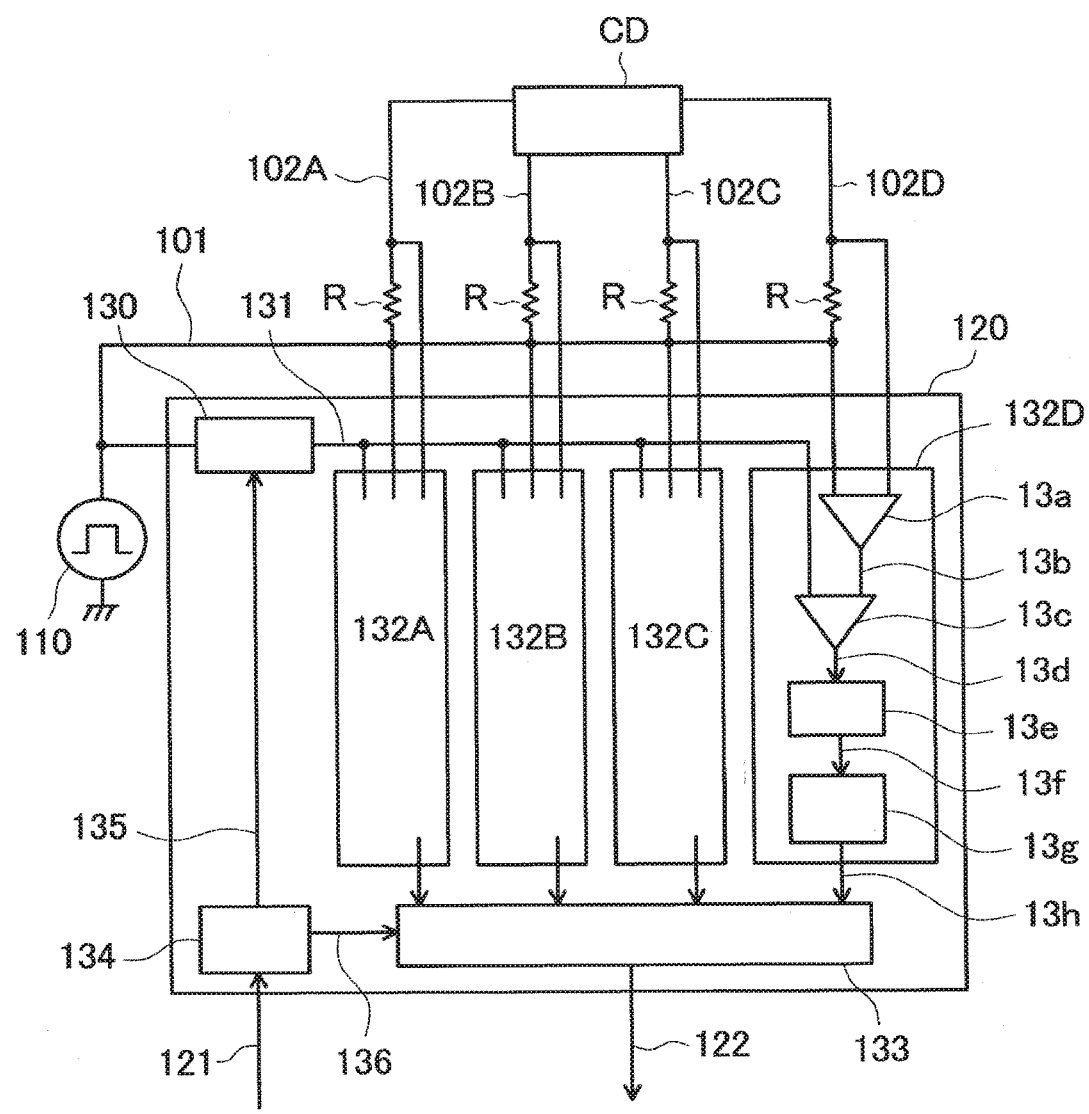
FIG. 5 is a block diagram showing the circuit configuration of the coordinate detection circuit shown in FIG. 4.
Figure 6A:
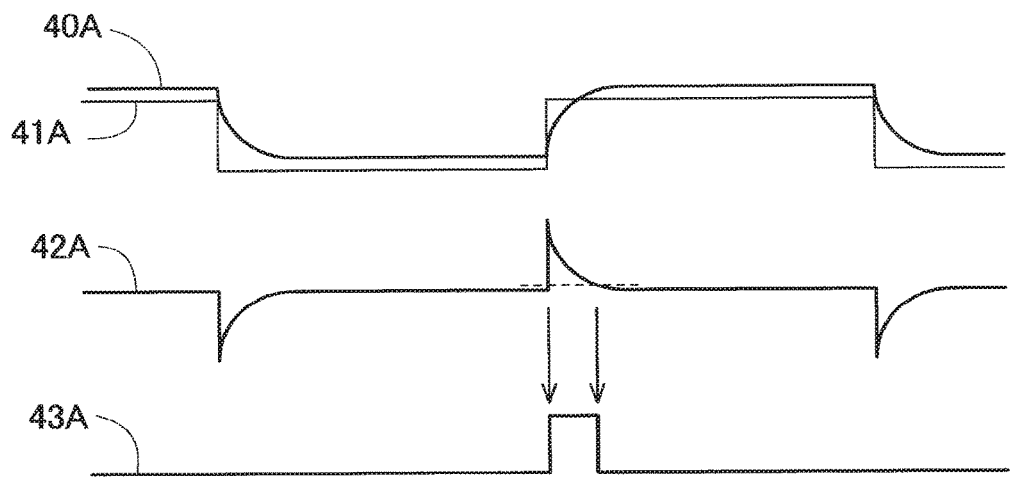
FIGS. 6A and 6B are waveform diagrams for explaining the operation of the coordinate detection circuit shown in FIG. 5.
Figure 6B:
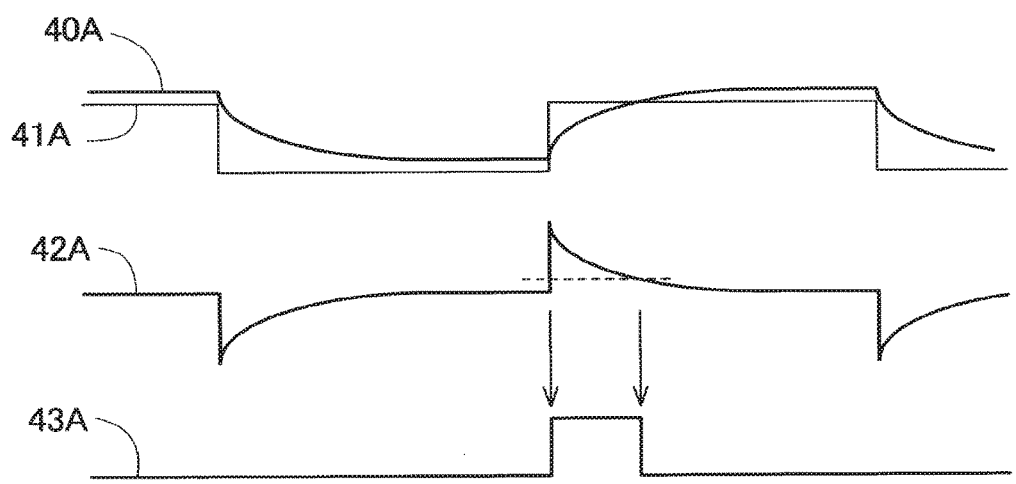

FIG. 5 is a block diagram showing the circuit configuration of the coordinate detection circuit 120 shown in FIG. 4, FIGS. 6A and 6B are waveform diagrams for explaining the operation of the coordinate detection circuit 120 shown in FIG. 5.

In FIG. 5, the coordinate detection circuit 120 includes waveform detection circuits (132A, 132B, 132C, and 132D) that detect the inner node voltage waveforms of the transparent conductive layer (CD) from the four corners (upper right, lower right, upper left, and lower left) of the transparent conductive layer (CD), and a coordinate position calculation circuit 133 that receives the detected data, which are the outputs of the waveform detection circuits, and calculates the coordinate position.

Each of the waveform detection circuits (132A, 132B, 132C, and 132D) receives the inner node voltage (the voltage having the voltage waveform indicated by reference character 40A in FIGS. 6A and 6B) via the corresponding one of the inner node voltage lines (102A, 102B, 102C, and 102D) of the transparent conductive layer (CD) and the alternating voltage (the voltage having the voltage waveform indicated by reference character 41A in FIGS. 6A and 6B) via the transparent conductive layer input voltage line 101, The inputted voltage levels are compared in a comparator circuit (13a), and the differential voltage (the voltage having the voltage waveform indicated by reference character 42A in FIGS. 6A and 6B) is outputted to a differential voltage output line (13b).

A comparator circuit (13c) compares the level of differential voltage outputted to the differential voltage output line (13b) with the level of the reference voltage obtained by using a voltage divider circuit 130 to divide the alternating voltage generated in the transparent conductive layer input voltage generation circuit 110.

In FIG. 5, during the period when a differential voltage higher than the reference voltage is being inputted, a "High level" pulse width signal (the pulse signal indicated by reference character 43A in FIGS. 6A and 6B) is outputted to a pulse width signal output line (13d).

A counter (13e) converts the "High level" period of the inputted pulse width signal into a count, and outputs the value of the time constant of the inner node voltage as the counter output data (13f) for digital processing.

A filter circuit (13g) averages a plurality of counter output data (13f) to prevent malfunction. The filter output data (13h) of the filter circuit (13g) is inputted to the coordinate position calculation circuit 133.

The coordinate position calculation circuit 133 calculates the contact position (coordinate position) of the finger (FIN) on the backside transparent conductive layer (CD) based on the filter output data (13h) outputted from the waveform detection circuits (132A, 132B, 132C, and 132D), and outputs the result as coordinate data 122.

In FIG. 5, reference numeral 134 denotes an adjustment control circuit, which controls the coordinate position calculation circuit 133 and adjusts the voltage division ratio used in the voltage divider circuit 130 based on an externally inputted control signal.

FIG. 6(A) is a waveform diagram for explaining the operation of the coordinate detection circuit 120 in the non-contact state in which the finger (FIN) is not in contact with the backside transparent conductive layer (CD). FIG. 6(B) is a waveform diagram for explaining the operation of the coordinate detection circuit 120 in the contact state in which the finger (FIN) is in contact with the backside transparent conductive layer (CD).

FIGS. 6(A) and 6(B) show that the "High" level (first voltage level) period of the pulse width signal indicated by the reference character 43A in the non-contact state in FIG. 6(A) is shorter than the "High" level period of the pulse width signal indicated by the reference character 43A in the contact state in FIG. 6(B).

Judging the "High" level period of the pulse width signal therefore allows detection of whether or not the finger (FIN) is in contact with the backside transparent conductive layer (CD).

It is noted that in the contact state, the "High" level period of the pulse width signal generated in each of the waveform detection circuits (132A, 132B, 132C, and 132D) varies depending on the contact position of the finger (FIN).

That is, depending on the contact position of the finger (FIN) on the backside transparent conductive layer (CD), the distance between the contact position and each of the inner node voltage lines (102A, 102B, 102C, and 102D) varies. In other words, the value of the inner resistance (INR) in the backside transparent conductive layer (CD) between the contact position of the finger (FIN) on the backside transparent conductive layer (CD) and each corner of the backside transparent conductive layer (CD) varies.

Therefore, the amount of voltage distortion that appears on each of the inner node voltage lines (102A, 102B, 102C, and 102D) varies according to the value of the inner resistance (INR). As a result, the "High" level period of the pulse width signal varies, allowing detection of the contact position (coordinate position) of the finger (FIN) on the backside transparent conductive layer (CD).

FIG. 7 shows an example of the specific configuration of the liquid crystal display panel according to this embodiment.

In FIG. 7, a first substrate 203 and a second substrate 201, which is smaller than the first substrate, are overlaid, and a planar transparent conductive layer 704 is disposed on the second substrate 201. In an IPS liquid crystal display device, the transparent conductive layer 704 can be configured by using a planar backside transparent conductive layer disposed on one side of the second substrate opposite to where the liquid crystal material is disposed to reduce display noise.

In a liquid crystal display device that requires no transparent conductive layer to be formed on one side of the second substrate opposite to where the liquid crystal material is disposed, as in a TN liquid crystal display panel and a VA liquid crystal display panel, a transparent conductive layer will be newly formed.

A transparent conductive member 705 is then disposed on the transparent conductive layer 704 to prevent a finger of the viewer from directly touching the transparent conductive layer 704. Such a configuration is particularly effective when no polarizer plate is disposed on the second substrate 201 (the side opposite to where the liquid crystal material is disposed) but a polarizer plate (or a polarizer film) is built in under the second substrate 201 (the side where the liquid crystal material is disposed). The conductive member 705 can of course be configured by using a conductive polarizer plate. (FIG. 3 illustrates such a configuration). Since the conductive member 705 is primarily provided to protect the transparent conductive layer 704, the conductive member 705 can be omitted, for example, when it is not necessary to protect the transparent conductive layer 704. It is conceivable that the conductive member 705 may be replaced with an anti-reflection layer (AR layer) or an anti-dirt layer, or may also serve as anti-reflection layer or an anti-dirt layer.

In this embodiment, the transparent conductive layer 704 is used as the transparent electrode of the capacitive touch screen. To this end, for example, a rectangular transparent conductive layer is used and alternating voltage for position detection is supplied to the four corners of the rectangle. FIG. 7 shows how to specifically achieve such a configuration.

Terminals 703 to which the alternating voltage for position detection is supplied are disposed on the first substrate 203. The terminals 703 are electrically connected to the four corners of the transparent conductive layer 704, for example, through conductive tapes 701.

Since two (two positions) of the four corners of the transparent conductive layer 704 are distant from the terminals 703 to which the alternating voltage for position detection is supplied, for example, each of these two corners is electrically connected to a relay terminal 702 disposed on the first substrate 203 through the conductive tape 701, and the relay terminal 702 is then connected through a wiring line 706 to the terminal 703 to which the alternating voltage for position detection is supplied.

To achieve such a configuration, the first substrate 203 is configured in such a way that the substrate width w1 of the first substrate 203 is wider than the substrate width w2 of the second substrate 201. The terminals 703 to which the alternating voltage for position detection is supplied are connected to a drive circuit chip 713 through a driver chip 707 and a flexible printed circuit board 708 or directly through the flexible printed circuit board 708 without passing through the driver chip 707.

Figure 8:
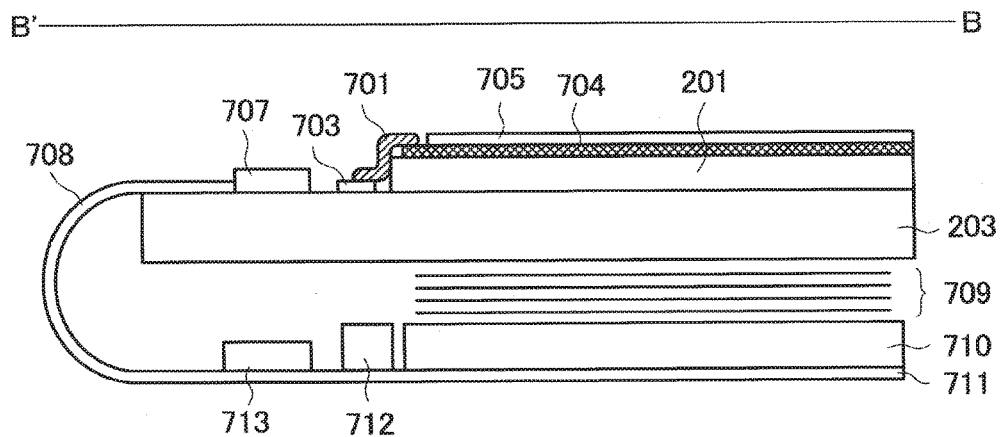
FIG. 8 is a cross-sectional view showing the cross-sectional structure taken along the cutting line B-B' shown in FIG. 7.

FIG. 8 is a cross-sectional view showing the cross-sectional structure taken along the cutting line B-B' shown in FIG. 7.

As shown in FIG. 8, the drive circuit chip 713 is disposed on the flexible printed circuit board 708, and one or more LED light sources 712, for example, are disposed next to a light guide plate 710. A polarizer plate (not shown) is disposed on the underside of the first substrate (the side opposite to where the liquid crystal material is disposed). Furthermore, a plurality of optical sheets 709, such as an upper diffuser sheet, an upper prism sheet, a lower prism sheet, and a lower diffuser sheet, are disposed under the first substrate 203. Since these optical sheets are disposed to improve optical characteristics, a greater or fewer number of optical sheets can be disposed as required. One optical sheet may suffice in some cases. The light guide plate 710 is disposed under the optical sheets 709, and a reflective sheet 711 is disposed on the underside of the light guide plate 701.

Figure 9:
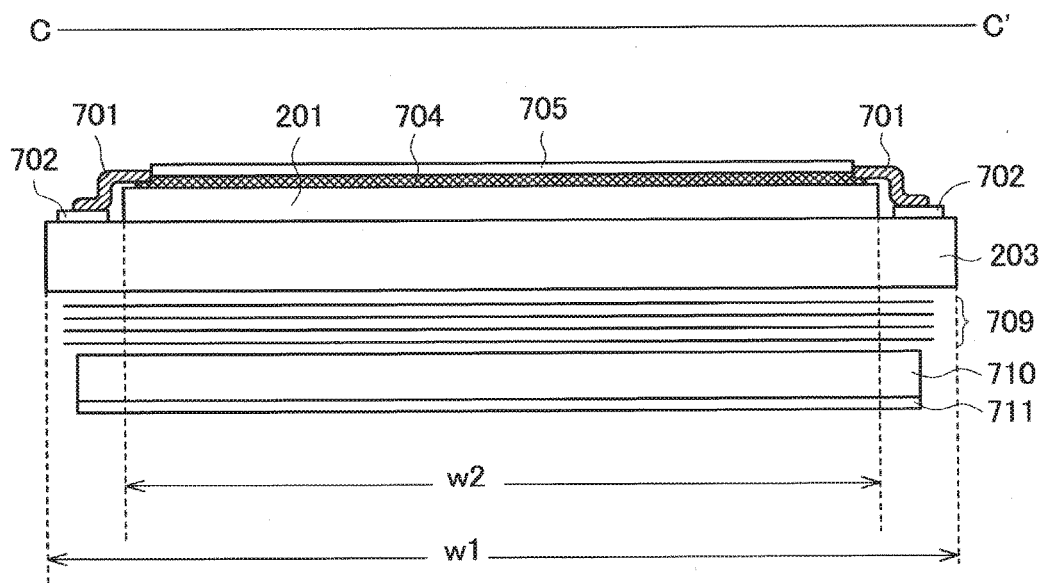
FIG. 9 is a cross-sectional view showing the cross-sectional structure taken along the cutting line C-C' shown in FIG. 7.

FIG. 9 is a cross-sectional view showing the cross-sectional structure taken along the cutting line C-C' shown in FIG. 7.

As shown in FIG. 9, the substrate width w1 of the first substrate 203 is wider than the substrate width w2 of the second substrate, and the wider portions are used to form the terminals and route the wiring lines. In FIG. 9, the substrate thickness of the first substrate 203 is illustrated to be thicker than that of the second substrate 201. This is because the thickness of the second substrate is reduced by mechanical or chemical polishing to meet the demand of a thinner display device. The first substrate 203 may of course be polished as well to a thickness comparable to that of the second substrate 201 as required.

Figure 10:
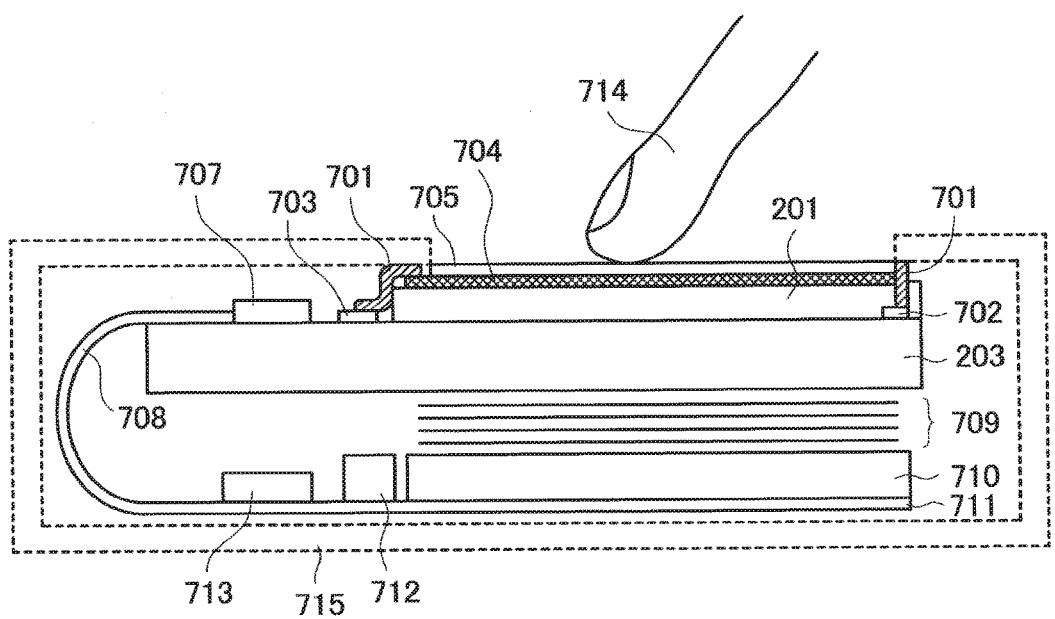
FIG. 10 shows the liquid crystal display module with a tough panel according to the embodiment of the invention disposed, for example, in a housing of a mobile phone.

FIG. 10 shows the liquid crystal display module with a tough panel according to this embodiment disposed, for example, in a housing 715 of a mobile phone. As shown in FIG. 10, the conductive member 705 is not covered with the housing 715, and a finger 714 of the viewer will touch the exposed conductive member 705.

As described above, this embodiment can make use of the characteristics of an IPS liquid crystal display panel and provide a liquid crystal display module with a capacitive high-transmittance touch screen at a low cost.

That is, according to this embodiment, no new glass substrate (that is, a touch screen substrate) is required because the backside transparent conductive layer (CD) also serves as the transparent electrode of the capacitive touch screen. It is therefore possible to prevent reduction in transmittance and increase in cost.

Furthermore, in this embodiment, the fact that no new glass substrate (that is, a touch screen substrate) is required allows the liquid crystal display module to be thinner and lighter.

While the invention made by the present inventor has been specifically described above with reference to the above embodiment, the invention is not limited thereto. Various changes can be made thereto to the extent that they do not depart from the spirit of the invention.

In above embodiment, the conductive layer is the planer conductive layer. In addition, the conductive layer may be not only the planer conductive layer, but also liner conductive layer or matrix conductive layer.

Figure 11:
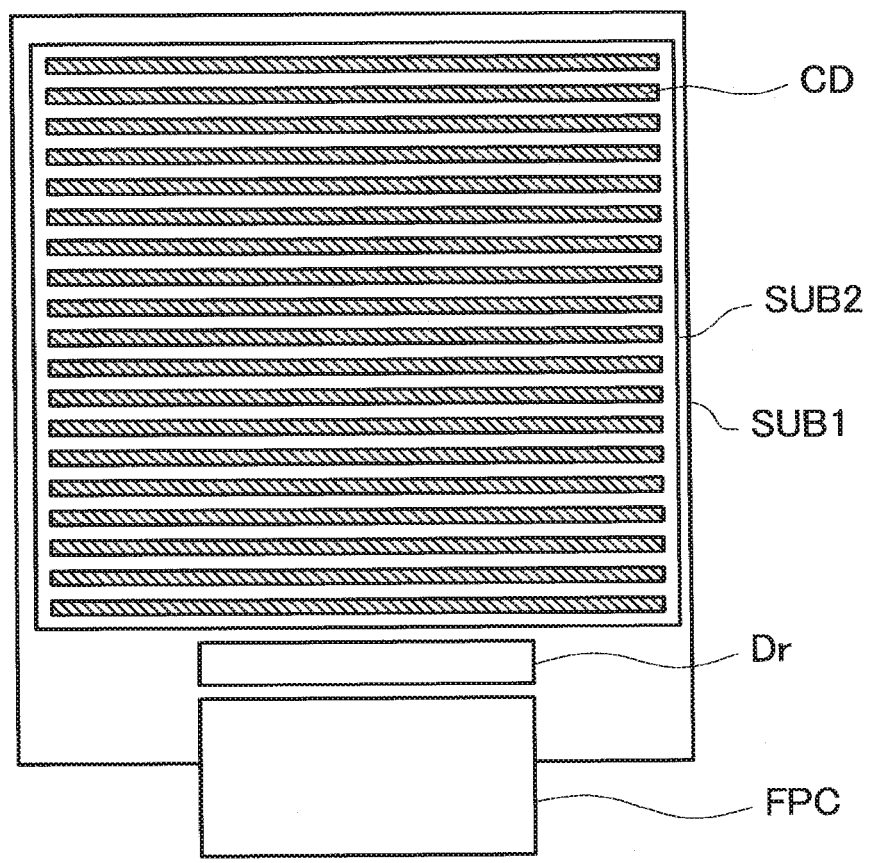
FIG. 11 shows an example of the specific configuration of the liquid crystal display panel according to the embodiment of the invention.
Figure 12:
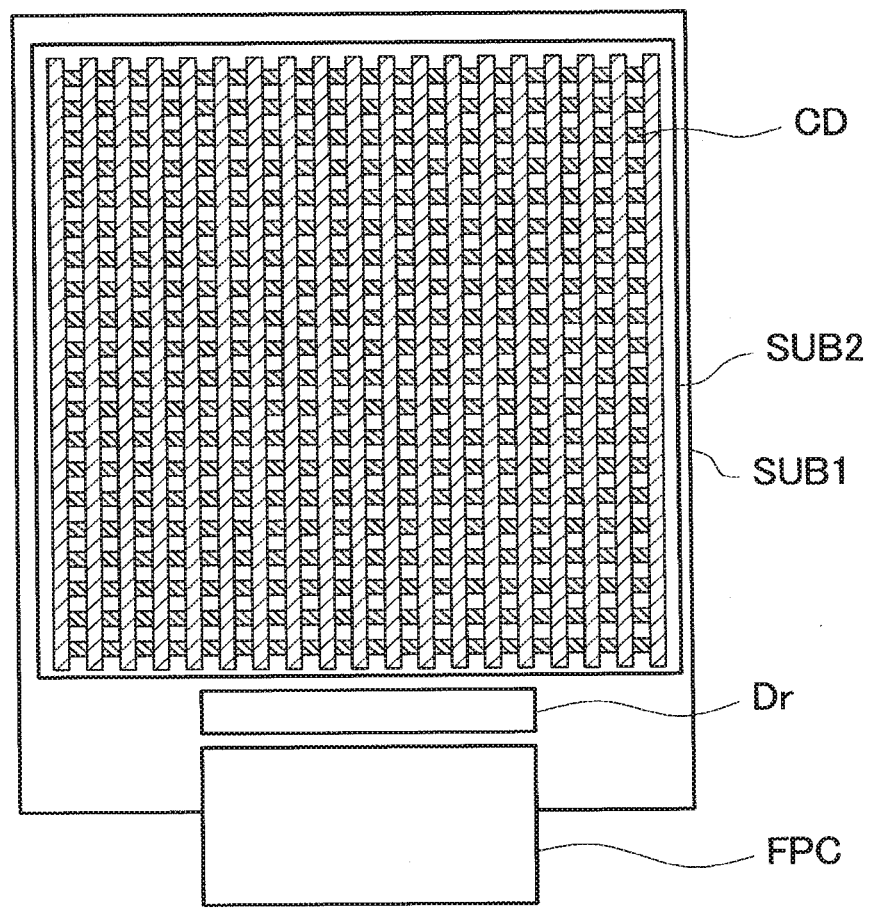
FIG. 12 shows an example of the specific configuration of the liquid crystal display panel according to the embodiment of the invention.

FIG. 11 is a plan view showing the configuration of the backside transparent conductive layer (CD) formed the matrix. FIG. 12 is a plan view showing the configuration of the backside transparent conductive layer (CD) formed the strip.

What is claimed is:

1. A display device comprising:
   a first substrate;
   a second substrate smaller than the first substrate;
   a touch detecting electrode for detecting a position;
   a plurality of terminals provided on the first substrate for supplying a position detection voltage to the touch detecting electrode;
   a wiring line provided on the first substrate and connecting to one of the plurality of terminals;
   a transparent electrically conductive protecting layer is disposed above the second substrate; and
   a flexible printed circuit board supplying a signal to the first substrate and connecting to the first substrate, wherein
   the touch detecting electrode has a near side to the flexible printed circuit board and a far side which is opposed to the near side,
   the touch detecting electrode has a first connecting portion and a second connecting portion which are electrically connects with one of the plurality of terminals respectively,
   the first connecting portion supplies the position detecting voltage to the near side of the touch detecting electrode,
   the second connecting portion supplies the position detecting voltage to the far side of the touch detecting electrode, and
   the wiring line electrically connects between the second connecting portion and one of the plurality of terminals.

2. The display device according to claim 1, wherein the first connecting portion is provided on a corner of the near side of the touch detecting electrode.

3. The display device according to claim 1, wherein the second connecting portion is provided on a corner of the far side of the touch detecting electrode.

4. The display device according to claim 1, wherein the plurality of terminals is provided between the near side of the touch detecting electrode and the flexible printed circuit board.

5. The display device according to claim 1, wherein the display device is a liquid crystal display device.

6. A display device comprising:
   a first substrate;
   a second substrate smaller than the first substrate;
   a touch detecting electrode for detecting a position and including a first side, second side, third side, and fourth side;
   a plurality of terminals provided on the first substrate for supplying a position detection voltage to the touch detecting electrode;
   a wiring line provided on the first substrate and connecting to one of the plurality of terminals;
   a transparent electrically conductive protecting layer is disposed above the second substrate; and
   a flexible printed circuit board supplying a signal to the first substrate and connecting to the first substrate, wherein
   the first side of the touch detecting electrode is a nearest side to the flexible printed circuit board,
   the second side is opposed to the first side,
   the third side and the fourth side intersect the first side and the second side,
   the touch detecting electrode has a first connecting portion, a second connecting portion, a third connecting portion, and fourth connecting portion,
   the first connecting portion electrically connects with one of the plurality of terminals and supplies the position detecting voltage to a corner portion between the first side and the third side,
   the second connecting portion electrically connects with one of the plurality of terminals and supplies the position detecting voltage to the second side and the third side,
   the third connecting portion electrically connects with one of the plurality of terminals and supplies the position detecting voltage to a corner portion between the first side and the fourth side, the fourth connecting portion electrically connects with one of the plurality of terminals and supplies the position detecting voltage to the second side and the fourth side, the wiring line electrically connects between the second connecting portion and one of the plurality of terminals.

7. The display device according to claim 6, wherein the plurality of terminals is provided between the near side of the touch detecting electrode and the flexible printed circuit board.

8. The display device according to claim 6, wherein the wiring line is along the third side.

9. The display device according to claim 6, further comprising another wiring line which electrically connects between the fourth connecting portion and one of the plurality of terminals.

10. The display device according to claim 6, wherein the display device is a liquid crystal display device.

* * * * *